June 25, 1940.　　　C. G. ABBOT　　　2,205,378
SOLAR FLASH BOILER
Filed March 12, 1938　　　3 Sheets-Sheet 1
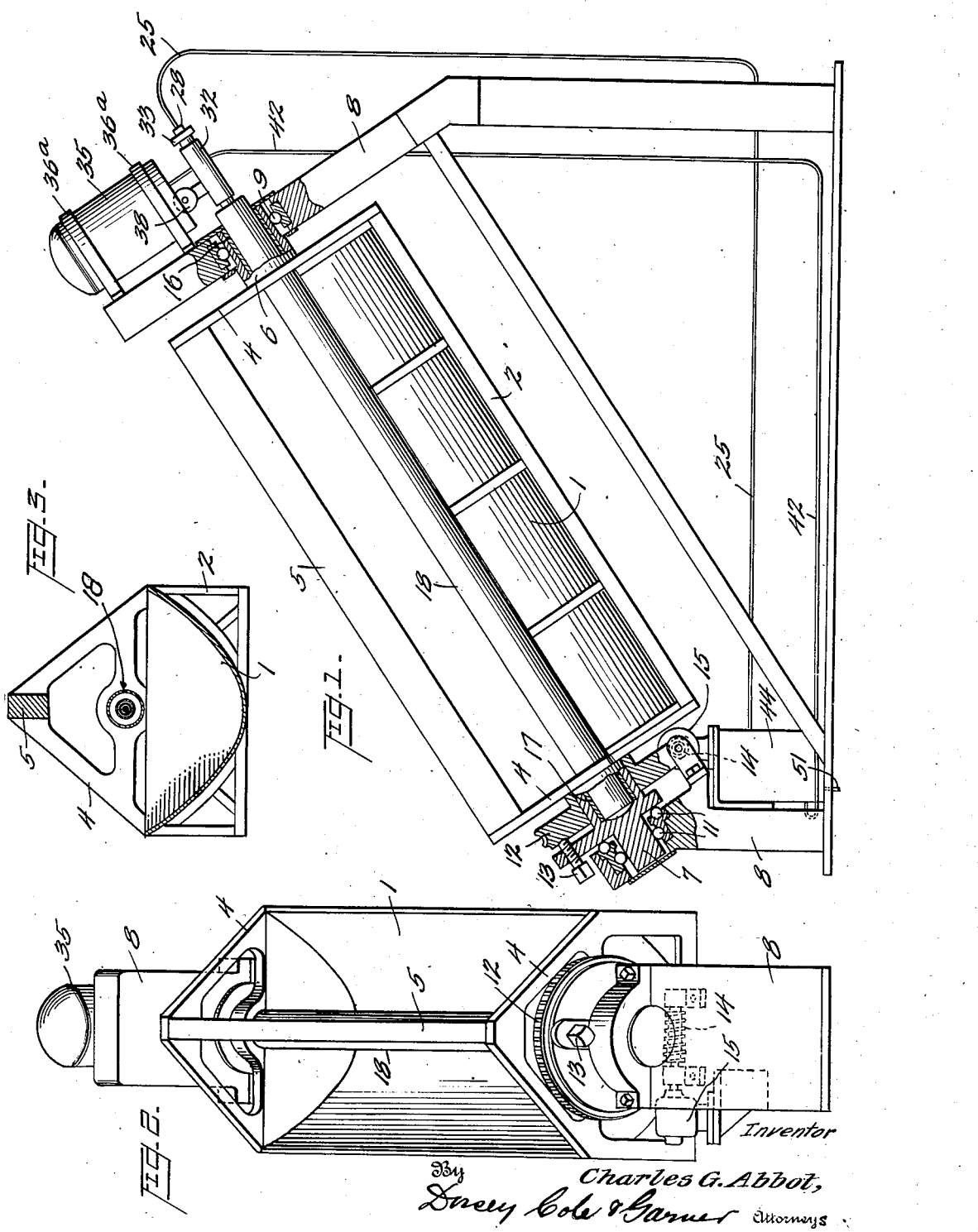

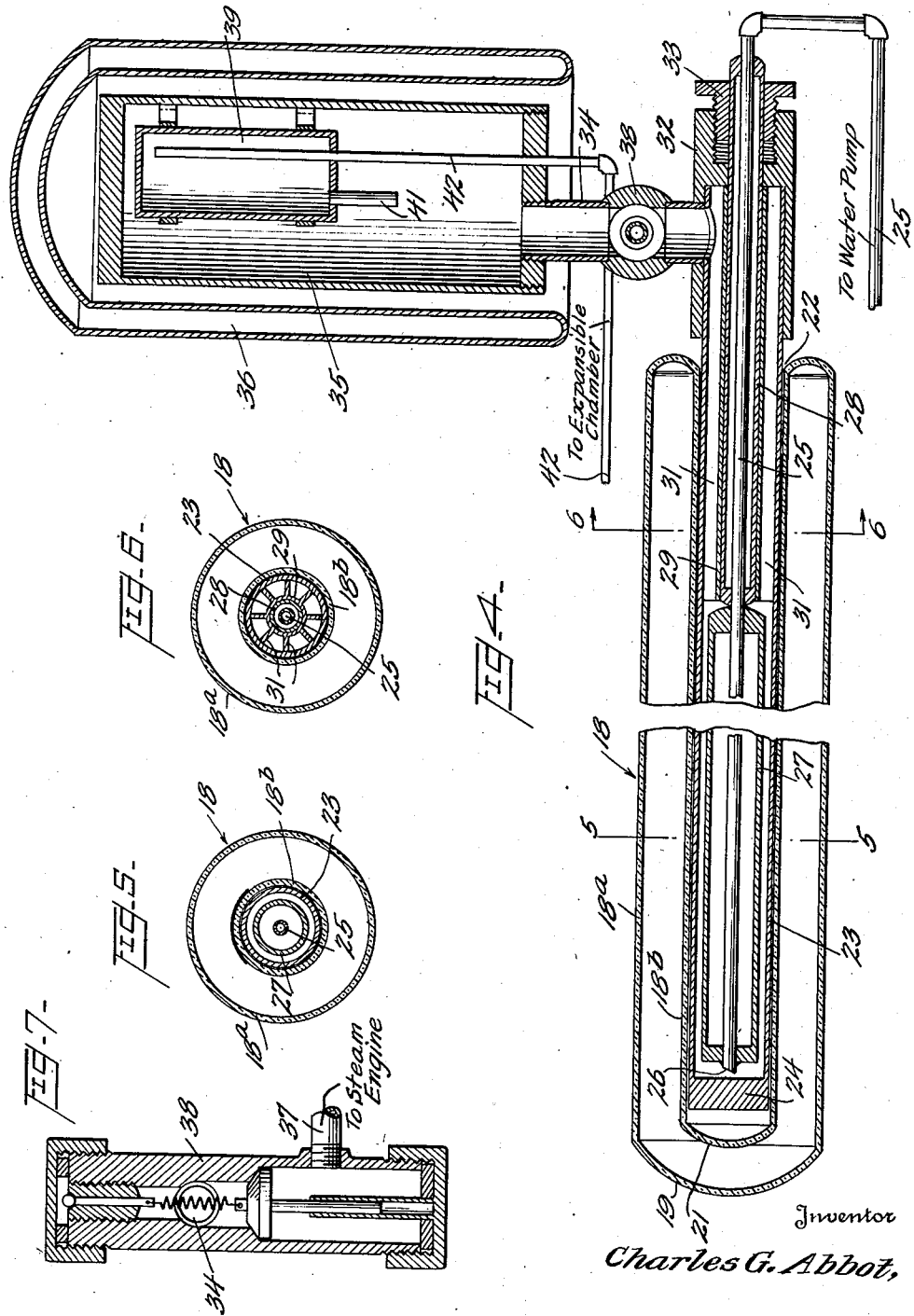

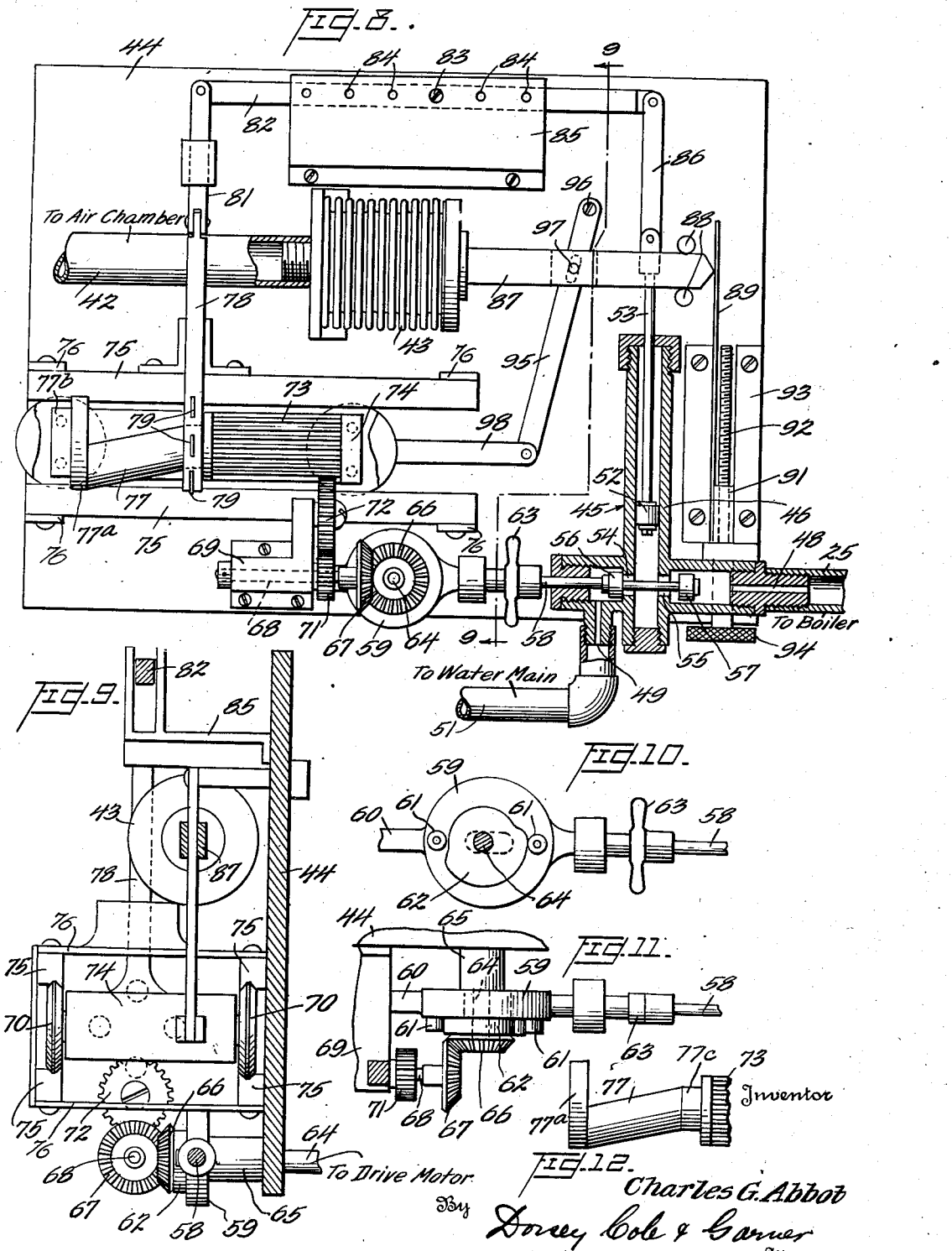

Patented June 25, 1940

2,205,378

UNITED STATES PATENT OFFICE 2,205,378

SOLAR FLASH BOILER

Charles Greeley Abbot, Washington, D. C.

Application March 12, 1938, Serial No. 195,648

14 Claims. (Cl. 126—271)

My invention relates to improvements in solar flash boilers. In devices of this type I have found it desirable to employ a boiler of minimum heat capacity or so called "flash boiler" for raising steam from the energy of solar radiation, rather than a boiler of large heat capacity. At most operating stations the sun is occasionally obscured by clouds or fog, and indeed the day itself is of limited duration. For these reasons when the sky is clear around the sun much time is lost if a boiler of large heat capacity is utilized because it requires considerable time to raise steam to the desired pressure.

An object of the present invention, therefore, is to employ a boiler of minimum heat capacity and at the same time to supply it with water at a rate automatically regulated to suit the brightness of the sun from moment to moment, so that the water supply to the heater shall at all times be turned entirely into steam at a nearly uniform pressure while flowing through the boiler, being neither too great nor too small in amount.

From numerous experiments I have been led to prefer that type of sun exposing apparatus in which the heater element or boiler tube is inclined parallel to the axis of the earth and in the focus of a concave cylindric mirror of parabolic cross-section. The mirror is rotated about its focal line by suitable mechanism preferably a synchronous motor, the driving arrangement being such as to bring the solar rays to focus accurately upon the heater element during the apparent daily travel of the sun.

In solar boilers for power purposes great economy of heat is desirable to prevent the size of the solar heat collector from entailing a prohibitive cost in comparison to the value of the power produced. Experiments have indicated that this economy can be well effected by providing a parabolic mirror and positioning in the focal axis of the mirror a heating element, as indicated above, and enclosing the same within a jacket having inner and outer walls which are highly transparent to solar rays but highly opaque to long wave rays radiated by the heater element. The space between the inner and outer walls of the jacket is highly evacuated.

Provision for the unequal expansion of the inner and outer wall of the jacket, due to unequal temperatures is effected by having one end of the jacket entirely closed leaving the opposite end open. Feed water is fed to the boiler by suitable means entering the open end of the jacket and steam generated by the solar rays leaves the boiler by way of the same open end. The steam generated by the boiler per se is led into a steam chest and to the engine or other device where the steam is to be utilized.

The pressure of the steam generated is utilized to control the capacity of the boiler feed pump and additional means are provided for varying such capacity. Actuating means are provided for the pump which is coordinated and associated with the pump control means.

Further details of the invention will more fully appear from the following description and drawings in which:

Figure 1 is a side view partly in section to show the bearing support of my solar flash boiler, the longitudinal axis of which is parallel to the axis of the earth.

Figure 2 is an end view of Figure 1.

Figure 3 is a transverse section of the concave cylindric mirror of parabolic cross-section and illustrating a portion of its cradle.

Figure 4 is a longitudinal section partially illustrating the water feed and the surrounding jackets and tubes with a chest for the reception of steam generated by the boiler.

Figure 5 is a transverse section on line 5—5 of Figure 4.

Figure 6 is a transverse section on line 6—6 of Figure 4.

Figure 7 is a longitudinal section through a valve interposed in the steam pipe line from the solar boiler to prevent loss of feed water when sun rays are cut off.

Figure 8 is a side elevation partly in section illustrating the feed water pump, means for varying the capacity thereof and means for automatically operating the pump.

Figure 9 is a section on the line 9—9 of Figure 8.

Figure 10 is a detail side view illustrating the cam means for actuating the valves of the feed water pump.

Figure 11 is a detail plan view illustrating in part the drive for the feed water pump.

Figure 12 is a fragmentary view illustrating the movable cam controlling the amplitude of stroke of the piston of the water feed pump.

A concave cylindric mirror of parabolic cross-section 1 is carried in a cradle 2, as illustrated in Figures 1, 2 and 3. The precise shape of the mirror shown in Figure 3 is merely representative of a mirror of that type and is not to be considered as satisfying the formula hereinafter suggested for the formation of the same. The mirror may be suitably constructed of a sheet of polished aluminum from the product "Alcoa" manufactured by the Aluminum Company of America. The cradle 2 of skeleton form may be fashioned of aluminum and duralumin and machined to a correct parabolic curvature in order to support the mirror against deformation at all times. In fashioning the curvature of the cradle and mirror it has been found satisfactory to use a parabolic curve having the equation $$y^2 = 36x$$

This gives a rather flat curvature to which it is easy to bend the thin reflecting sheet forming the mirror. In fashioning the mirror from "Alcoa" it has been found to reflect to focus about 82% of the solar radiations reaching it.

The cradle 2 is provided at each end with upstanding arms 4 connected together by the counterbalance 5. Each end of the cradle 2 is provided with hollow trunnions 6 and 7. The upper trunnion 6 is mounted to rotate in a frame 8 by means of ball bearings 9 and the lower trunnion 7 is mounted in the frame upon ball and thrust bearings 11. A worm wheel 12 is loosely mounted on the trunnion 7 but is adapted to be made fast thereto by means of the screw 13 or other suitable clutching device connected to the trunnion and arranged to clutch and de-clutch the worm wheel in respect to the trunnion. A worm 14, driven by a 60 cycle synchronous motor 15, engages the worm wheel 12. The speed of the motor and the ratio of the gearing should be such that the mirror is driven accurately through an arc of 15° per hour thereby keeping the mirror in such position as to maintain a fixed focus of solar radiation during its apparent daily travel.

The apparatus includes a plurality of jackets, tubes and pipes hereinafter described, all of which should be located coaxial to the focal axis of the mirror 1 which is parallel to the axis of the earth as suggested in Figure 1, and are maintained in a stationary position during the rotation of the mirror.

Supported within the hollow trunnions 6 and 7 by suitable retaining means 16 and 17 is a double walled jacket 18 having an outer wall 18a and an inner wall 18b, the walls of which are highly transparent to solar rays but highly opaque to long wave rays, for example rays emitted by bodies at the ordinary temperatures of steam. It has been found satisfactory to construct this tube or jacket 18 of the glass called "Pyrex," a product of the Corning Glass Works, Corning, New York. The space between the walls is highly evacuated.

Inasmuch as the inner and outer walls of the jacket or tube 18 may be subjected to unequal expansion, owing to unequal temperatures, it has been found satisfactory and efficient to provide for this differential expansion to close one end of the jacket, as indicated at 19 and 21 in Figure 4, leaving the opposite end of the jacket open as at 22, since it is natural for steam to rise by gravity differential. It is preferable to metallically plate about one-third of the circumference of the outer surface of the inner wall 18b of the jacket 18 between the focal axis of the mirror and the sun so as to diminish heat losses.

Within the inner wall of the vacuum jacket 18 is a metallic boiler tube 23 having an outside diameter slightly less than the inner wall of the vacuum jacket. The boiler tube 23 is coated with a layer of substance highly absorptive of solar rays and it has been found satisfactory to paint the tube with a suspension of lamp black in alcohol containing a small proportion of shellac, and to heat the coating thus produced in a flame until the alcohol evaporates and the shellac sets hard and chars thus producing a firm, highly absorptive black coating. The lower end of the tube 23 is closed at 24 and its upper end is in communication with a pipe and other appliances hereinafter described.

Water is injected into the generator through the pipe 25 the lower end of which is open as at 26. A water spreader tube 27 is spaced from and surrounds approximately two-thirds of the lower end of the water pipe 25. It is also spaced from the walls of the metallic boiler tube 23. The ends of the spreader tube are sealed to the water pipe 25. The upper part of the water pipe 25 is hermetically enclosed by a tube 28 and the space between the water tube 25 and the wall of the tube 28 is highly evacuated.

Water is injected through the relatively small water tube 25 and discharges through the lower end 26 thereof. It then flows upwardly in a thin sheet bathing the inner wall of the boiler tube 23. Since the upper part of the water pipe 25 is enclosed by the vacuum tube 28, steam rising in the generator will not be cooled or condensed by the relatively cool water pipe 25. In order to more effectively conduct heat throughout the steam to superheat it there is positioned in the free space outside of the vacuum tube 28 and within the boiler tube 23 a sleeve 29 provided with a number of wing-like surfaces 31. The sleeve and wing-like surfaces are preferably formed of copper or a metal of high heat conductivity.

The upper end of the boiler tube 23 is sealed into a T connection 32 and the vacuum tube 28 and water pipe 25 preferably extend through and beyond the horizontal leg of the T connection, as shown in Figure 4. The upper end of the horizontal leg of the T connection is closed by a steam tight stuffing box 33. The vertical leg of the T connection is in communication with a pipe 34 which leads to a steam chest 35. The steam chest is enclosed along its sides and top by a highly evacuated chamber 36 to prevent undue loss of heat. This chamber may be supported by cushioned straps 36a from the frame 8, as shown in Figure 1.

The pipe 34 is in communication with a pipe 37 which may lead to a steam engine or other devices utilizing steam for heating, evaporating, or other purposes. A poppet valve 38, as shown in Figure 7, is interposed between the pipe 34 and pipe 37 to prevent loss of feed water in the engine pipe line when the sun's rays are obscured and the steam cools and loses its pressure, or has a tendency to condense. A substantial decrease of the steam pressure will permit the valve to close and an increase thereof will open the valve.

Within the steam chest 35 is an air chamber 39 carried thereby open to the chest by a pipe 41 to admit steam under pressure from the chest. A pipe 42 extends downwardly from the upper portion of the air chamber and leads to the control mechanism for the water feed pump hereinafter described. This pipe may contain an appropriate liquid such as water or oil acting as a fluid piston if desired and is connected to the interior of an expansible chamber hereinafter referred to.

Fastened to the lower end of the frame 8 or otherwise suitably mounted is a supporting plate 44 which carries the water feed pump, its actuating mechanism and automatic and variable control appliances. The water pump 45 consists of the cylinder 46 having an outlet 48 arranged at right angles thereto and connected with the feed water pipe 25. The pump has a water inlet 49 which is connected to the pipe 51 leading to the water main or source of supply (not shown). Within the cylinder is the piston 52 actuated by the piston rod 53. Inlet and outlet ports 54 and 55, respectively, are formed in the wall of the cylinder below the lowermost position assumed by the piston 52. These ports are adapted to be automatically and periodically opened and closed by the inlet valve 56 and outlet valve 57 in timed relation to the movements of the piston 52. These valves are mounted on one end of an actuating rod or stem 58. The opposite end of the stem is connected to a disk 59 carrying the cam rollers 61. The disk is suitably supported for sliding movement by the arm 60 working in a bearing carried by the supporting plate.

The disk 59 carrying the rollers 61 is moved back and forth in a rectilinear path by engagement with a cam 62 which is provided with sectors of greater and less radii, each approximating 180°. The shape of the cam should be such that the valves 56 and 57 are opened and closed at the proper time according to the position of the piston 52.

A closed leaf spring 63 or other resilient means is interposed between the rod 58 and the disk 61 in order to provide for cushioning of the valves upon seating.

The cam 62 is mounted on a drive shaft 64 carried in a suitable bearing 65 fast to the supporting plate 44. The shaft 64 is connected to an electric motor or other suitable source of power, not shown.

The shaft 64 carries on its outer end adjacent the cam 62 a beveled gear 66 which meshes with the beveled gear 67 mounted on the shaft 68 carried in a suitable bracket 69 mounted on the supporting plate 44. A spur gear 71 is fast to the shaft 68 and meshes with a pinion 72 rotatable upon the bracket 69. The pinion 72 meshes with an elongated gear 73 which is arranged for reciprocation in a longitudinal plane parallel to the axis of the pinion 72.

The elongated gear 73 has one end mounted for rotation in a bearing block 74 which extends outwardly from the axis of said gear as shown in Figure 9. A cam 77 having a cylindric surface is fast to the opposite end of the gear and the major portion of its axis is inclined to the axis of the gear 73. All cross sections of the cam 77 taken at right angles to the axis of gear 73 are circular. The end of the cam 77 remote from the gear is fast to a supporting head 77a which is journaled in a bearing block 77b. The outer ends of the bearing blocks 74 and 77b carry rollers 70 which are adapted to travel upon tracks 75. These tracks are supported by the plate 44 and are held in spaced relation by the cross bars 76. A portion 77c of the cam 77 adjacent the elongated gear 73 is co-axial with the axis of the gear 73 to an extent slightly greater than the width of the pitman rod hereinafter referred to as shown in Fig. 12. The remaining portion of the cam to the left of the portion 77b, see Fig. 12 has its axis inclined to the axis of the elongated gear as shown in Figure 8. The inclined cam thus forms in effect a cam of variable throw.

A pitman rod 78 carrying a plurality of rollers 79 having curved surfaces surrounds the cam 77 and is driven thereby. When the boiler is out of operation the end of the pitman rod 78 surrounds the portion 77c of the cam which is coaxial to the axis of the elongated gear 73, as shown in Figure 12 and when occupying this position the piston 52 of the water feed pump is idle. The end of the rod 78 remote from the cam is connected to one end of a link 81, suitably guided in a bearing, the opposite end of which is connected to a lever 82, the throw of which may be varied by means of a movable pin 83 and a series of holes 84 formed in a bracket 85 carried by the supporting plate 44, as shown in Figures 8 and 9. The end of the lever 82 remote from the link 81 is connected to a link 86 which in turn is connected to the piston rod 53 hereinbefore referred to.

The end of the expansible chamber 43 remote from the pipe 42 carries a rod 87 suitably guided as at 88, and its end engages a spring or flexible member 89. The flexible member 89 is connected to a nut 91 suitably mounted in a bracket 93 on the supporting plate 44 and is adapted to be raised and lowered by a screw 92. The screw 92 carries at one end a head or nut 94 by which the screw may be turned. With reference to Figure 8, if the screw 92 be turned in a direction to cause the flexible member 89 to rise, greater resistance will be applied to the rod 87 and conversely if the screw be turned so as to lower the flexible member 89 less resistance will be applied to the rod.

A lever 95 is pivoted to the supporting plate 44 as at 96, and is connected to the rod 87 by a pin and slot connection 97 or other suitable device. The lower end of the lever 95 is pivotally connected to a bar 98. The end of the bar 98 remote from the lever 95 is connected to the bearing block 74, which carries the elongated gear 73.

From the above description, it will be observed that the extent to which the chamber 43 expands and contracts thus controlling the movement of the rod 87, is influenced by and is directly proportional to the steam pressure in the chest 35. This relation is effected by the fluid piston in the pipe 42. The higher the steam pressure the greater the elongation of the expansible chamber and the lower the steam pressure the lesser the elongation of the expansible chamber.

It will also be observed that the extent to which the chamber 43 expands and thus controls the movement of the rod 87, is influenced to a greater or lesser extent by the resistance or dampening action of the flexible member 89, as above described. The extent of movement of the rod 87 by virtue of its connection with the lever 95 and pin 97 thus controls the extent of the rectilinear movement of the supporting means for the elongated gear 73. The greater the movement of the rod 87 to the right in Figure 8, the greater is the movement of the elongated gear 73 in the same direction. Conversely the smaller the movement of the rod 87 to the right, the smaller the movement of the elongated gear 73 and cam 77 in the same direction. These controls serve to move the inclined cam 77 and thus produce a throw of the pitman rod 78 to a greater or less extent which correspondingly effects the stroke of the piston 52 in the pump cylinder. These controls are all automatically operated under the influence of the steam pressure in the chest 35. As previously stated, however, a change in the pivotal point 83 of the lever 82 can be utilized in some degree to effect the same results, but such an adjustment is a manual one and not an automatic variable control. The above described mechanism also provides means to automatically supply water to the boiler at such a rate as to maintain an approximately constant predetermined pressure of steam with varying intensity of solar radiation, and to diminish or cut off the supply of water when solar rays are arrested.

What I claim is:

1. In a solar heater, in combination with a solar ray concentrator, a steam flash boiler of small heat capacity to be heated by absorbed solar rays, and a water injector adapted to automatically supply water to said boiler at such a rate that the concentrated solar radiation will convert immediately the water into steam and including means to control the supply of water to maintain an approximately constant pressure of steam with varying intensity of solar radiation and to cut off the supply of water when solar rays are arrested.

2. In a solar heater, in combination with a solar ray concentrator, a steam flash boiler of small heat capacity to be heated by absorbed solar rays, and a water injector adapted to automatically supply water to said boiler at a predetermined rate of delivery such that the concentrated solar radiation will convert immediately the water into steam and including means for automatically varying the rate of delivery of water from the injector with variations of the solar radiation.

3. In a solar heater, in combination with a concave, cylindric parabolic mirror having its focal line parallel to the axis of the earth, a ray-absorbing tubular flash boiler coaxial with the focal line of said mirror, a vacuum jacket surrounding said boiler comprising an inner and outer wall of a substance highly transparent to solar rays but highly opaque to long wave rays, said walls being hermetically sealed together and the space between them highly evacuated, and means including a feed water pipe to deliver a critical amount of water to the lower end of the boiler for conversion into steam.

4. In a solar heater, in combination with a solar ray concentrator, a steam flash boiler of small heat capacity to be heated by absorbed solar rays, a steam chest connected thereto and adapted to receive steam therefrom, a fluid motor connected to said steam chest and subjected to the pressure of the steam within said chest, a water feed pump including a piston, means for operating the same, and means automatically actuated by the fluid motor for controlling the amplitude of stroke of said piston to feed a critical amount of water to said boiler for complete and immediate conversion into steam.

5. In a solar heater, in combination with a ray concentrator, a steam generator of the flash type receiving rays from said concentrator, a steam chest connected thereto and adapted to receive steam therefrom, a fluid motor connected to said steam chest and subjected to the pressure of the steam within the chest, a water feed pump including a piston, operating connections between said fluid motor and said piston for controlling the amplitude of stroke of said piston to supply a critical amount of water to said generator for immediate and complete conversion into steam, and means for variably controlling the effective influence of said fluid motor to vary the amplitude of movement of said pump piston whereby the capacity of the pump per unit of time may be varied.

6. In a solar heater, in combination with a solar ray concentrator of the type employing a concave cylindric parabolic mirror having its focal line parallel to the earth's axis, a ray-absorbing tubular boiler of small heat capacity coaxial with the focal line of said mirror and provided with a vacuum jacket comprising an inner and outer wall of a substance highly transparent to solar rays but highly opaque to long wave rays, and a water injector adapted to supply water to said boiler and including means automatically operated to feed water to said boiler at a variable rate at which the water is converted immediately into steam with varying intensity of solar radiation.

7. In a solar heater, in combination with a solar ray concentrator, a steam flash boiler of small heat capacity to be heated by absorbed solar rays, and a water injector adapted to automatically supply water to said boiler at such a rate that the concentrated solar radiation will convert immediately the water into steam and cut off the supply of water when solar rays are arrested.

8. In a solar heater, in combination with a solar ray concentrator, and a tubular ray-absorbing boiler of small heat capacity receiving rays from said concentrator, a water injector for supplying water to said boiler at such rate as to convert immediately the water into steam to maintain an approximately constant steam pressure under variable intensity of solar rays and to stop the water supply when solar rays are cut off, said water injector comprising a pump including a piston which makes a stroke at uniform intervals, a device whereby the stroke of said piston is varied in length to be proportional to the steam pressure in said boiler, and means whereby said steam pressure is communicated from said boiler to said device.

9. In a solar heater, in combination with a solar ray collector and a boiler of the flash type for converting water fed thereto directly into steam and receiving rays from said collector, a water injector comprising a driving shaft actuating a pump having a piston reciprocating at uniform intervals, means for altering the amplitude of the stroke of said piston to be proportional to the pressure of steam in said solar flash boiler, said means comprising an air chamber open to the pressure of said steam, a longitudinally expansible chamber, a passage from said air chamber to said longitudinally expansible chamber through which the pressure in said air chamber is transmitted to said expansible chamber, an adjustable spring coacting with said expansible chamber whereby the expansion of said expansible chamber may be reduced in a desired proportion, and mechanism whereby the expansion of said expansible chamber increases the amplitude of the stroke of said pump.

10. In a solar heater, in combination with a solar ray collector and a boiler of the flash type for converting the water fed thereto directly into steam and receiving rays from said collector, a water injector comprising a driving shaft actuating a pump having a piston reciprocating at uniform intervals, means for altering the amplitude of the stroke of said piston to be proportional to the pressure of steam in said solar flash boiler, said means comprising an air chamber open to the pressure of said steam, a longitudinally expansible chamber, a passage from said air chamber to said longitudinally expansible chamber through which the pressure in said air chamber is transmitted to said expansible chamber, an adjustable member coacting with said expansible chamber whereby the expansion of said expansible chamber may be reduced in a desired proportion, and mechanism whereby the expansion of said expansible chamber increases the amplitude of the stroke of said pump, said mechanism comprising a carriage adapted to be moved longitudinally by the expansion of said expansible chamber, a driven shaft mounted on said carriage lengthwise of the movement of said carriage, said driven shaft driven positively by said driving shaft, said driven shaft carrying a cam extending longitudinally along said driven shaft and having its active surface inclined to the axis of said shaft, and linkage operated by said cam to reciprocate the piston of said pump.

11. In a solar heater, in combination with a solar ray concentrator, a steam flash boiler of small heat capacity to be heated by absorbed solar rays, and a water injector adapted to automatically supply water to said boiler at such a rate that the concentrated solar radiation will convert immediately the water into steam, said injector including means to regulate the supply of water to said boiler, and means responsive to steam pressure to control said regulating means and thereby maintain an approximately constant pressure of steam with varying intensity of solar radiation.

12. In a solar heater, in combination with a solar ray concentrator, a tubular ray-absorbing boiler receiving rays from said concentrator, a liquid tube extending into said boiler for directing liquid thereinto for immediate and complete conversion into vapor form, a vapor outlet passage from said boiler, and means automatically operated for controlling the supply of liquid through said tube to feed a critical amount of liquid to said boiler for complete and immediate conversion into vapor.

13. An automatic machine for efficiently utilizing solar radiation to produce steam at pressure above a predetermined minimum comprising an optical element adapted to concentrate solar radiation to a linear focus, said element being supported with said linear focus parallel to the axis of the earth and rotatable about an axis coincident with said linear focus at a rate adapted to retain said focus of solar radiation fixed upon said axis, a radiation-absorptive flash-boiler element coaxial with said axis, a transparent vacuum-jacket element coaxially enclosing said flash-boiler element, a conduit for conveying feed water to within said flash-boiler element, a conduit for conveying steam away from said flash-boiler element, an injector element for forcing water through said first-named conduit into said flash-boiler element, and a regulatory element for governing the delivery of feed water from said injector element to said flash-boiler element under control of the pressure of steam in said flash-boiler element, such that increasing steam pressure causes increased delivery of feed water.

14. An automatic machine for efficiently utilizing solar radiation to produce steam at pressures above a predetermined minimum comprising an optical element adapted to concentrate solar radiation to a linear focus, said element being supported with said linear focus parallel to the axis of the earth and rotatable about an axis coincident with said linear focus at a rate adapted to retain said focus of solar radiation fixed upon said axis, a radiation-absorptive flash-boiler element coaxial with said axis, a transparent vacuum-jacket element coaxially enclosing said flash-boiler element, a conduit for conveying feed water to within said flash-boiler element, a conduit for conveying steam away from said flash-boiler element, an injector element for forcing water through said first-named conduit into said flash-boiler element, a regulatory element for governing the delivery of feed water from said injector element to said flash-boiler element under control of the pressure of steam in said flash-boiler element, such that increasing steam pressure causes increased delivery of feed water, and a second regulatory element whereby said first-named regulatory element may be adjusted to vary said relationship of steam pressure to feed water delivery.

CHARLES GREELEY ABBOT.